(12) United States Patent
Morrow et al.

(10) Patent No.: US 11,329,506 B2
(45) Date of Patent: May 10, 2022

(54) MODULAR WIRELESS POWER BANK SYSTEM

(71) Applicant: Xentris Wireless LLC, Addison, IL (US)

(72) Inventors: Terrell Morrow, Woodridge, IL (US); Sophia G. Martin, Skokie, IL (US)

(73) Assignee: Xentris Wireless, LLC, Addison, IL (US)

( * ) Notice: Subject to any disclaimer, the term of this patent is extended or adjusted under 35 U.S.C. 154(b) by 68 days.

(21) Appl. No.: 16/781,353

(22) Filed: Feb. 4, 2020

(65) Prior Publication Data

US 2020/0266660 A1    Aug. 20, 2020

Related U.S. Application Data

(60) Provisional application No. 62/805,998, filed on Feb. 15, 2019.

(51) Int. Cl.
*H02J 50/00*  (2016.01)
*H02J 7/00*  (2006.01)
*H02J 50/10*  (2016.01)

(52) U.S. Cl.
CPC .......... *H02J 50/005* (2020.01); *H02J 7/0044* (2013.01); *H02J 50/10* (2016.02)

(58) Field of Classification Search
CPC ........ H02J 50/005; H02J 7/0044; H02J 50/10; H02J 2310/22; H02J 7/342
See application file for complete search history.

(56) References Cited

U.S. PATENT DOCUMENTS 8,528,244 B2 * 9/2013 Scallie ................. F41A 17/063
                                                              42/84
9,323,135 B1 * 4/2016 Veloso ................. G03B 17/561
(Continued)

FOREIGN PATENT DOCUMENTS

CN          208190724 U  * 12/2018  ................ F16B 2/22
WO     WO-2018038755 A1 *  3/2018  ......... F16M 11/2078
WO     WO-2019049056 A1 *  3/2019  ............ H02J 7/0044

OTHER PUBLICATIONS

Jong Han Jung; International Search Report, counterpart PCT Application No. PCT/US2020/018018, dated Jun. 2020, ISA/KR—KIPO, Daejeon, Republic of Korea.

*Primary Examiner* — Stacy Whitmore
(74) *Attorney, Agent, or Firm* — Andrew Babcock

(57) ABSTRACT

A modular wireless power bank system providing supplemental power for an electronic device includes: a power bank with a battery, a charge surface for wireless magnetic induction coupling, a power bank electromechanical connector and a means for coupling with the electronic device, aligned for power transfer via wireless magnetic induction coupling; and a desk stand comprising: a power bank socket configured to receive the power bank, the power bank socket including a stand electromechanical connector aligned to mate with the power bank electromechanical connector upon insertion of the power bank into the power bank socket; and an electronic device cradle configured to receive the electronic device; the power bank socket and the electronic device cradle aligned to receive the power bank and the electronic device either separately or while the power bank is coupled to the electronic device via the attachment means. A corresponding vehicle mount may also be included.

17 Claims, 20 Drawing Sheets

(56) References Cited

U.S. PATENT DOCUMENTS

| | | | |
|---|---|---|---|
| 9,899,850 B2* | 2/2018 | Wooley | H02J 7/0042 |
| 10,096,996 B1* | 10/2018 | Lin | H02J 7/0045 |
| 10,224,728 B1* | 3/2019 | Ashley | H04B 1/3883 |
| 10,958,103 B2* | 3/2021 | Langlois | H02J 50/10 |
| 2007/0096690 A1* | 5/2007 | Casale | H02J 7/0049 |
| | | | 320/112 |
| 2008/0230597 A1* | 9/2008 | Nakajima | G07F 7/08 |
| | | | 235/379 |
| 2008/0302868 A1* | 12/2008 | Nakajima | G07F 19/207 |
| | | | 235/379 |
| 2009/0095805 A1* | 4/2009 | Matsumoto | G07F 19/00 |
| | | | 235/379 |
| 2014/0117922 A1* | 5/2014 | Pham | H02J 7/0027 |
| | | | 320/103 |
| 2014/0354050 A1* | 12/2014 | Kung | H02J 7/0068 |
| | | | 307/24 |
| 2016/0020626 A1 | 1/2016 | Lee | |
| 2016/0261138 A1* | 9/2016 | Wu | H02J 7/0044 |
| 2017/0110902 A1 | 4/2017 | Miller et al. | |
| 2018/0043840 A1* | 2/2018 | Minn | B60R 11/02 |
| 2018/0300697 A1* | 10/2018 | Han | H02J 7/0049 |
| 2020/0112205 A1* | 4/2020 | Weisband | H02J 7/0045 |
| 2020/0259345 A1* | 8/2020 | Kanakis | H02J 7/0044 |
| 2020/0412145 A1* | 12/2020 | Rosenthaler | H02J 7/0047 |

* cited by examiner

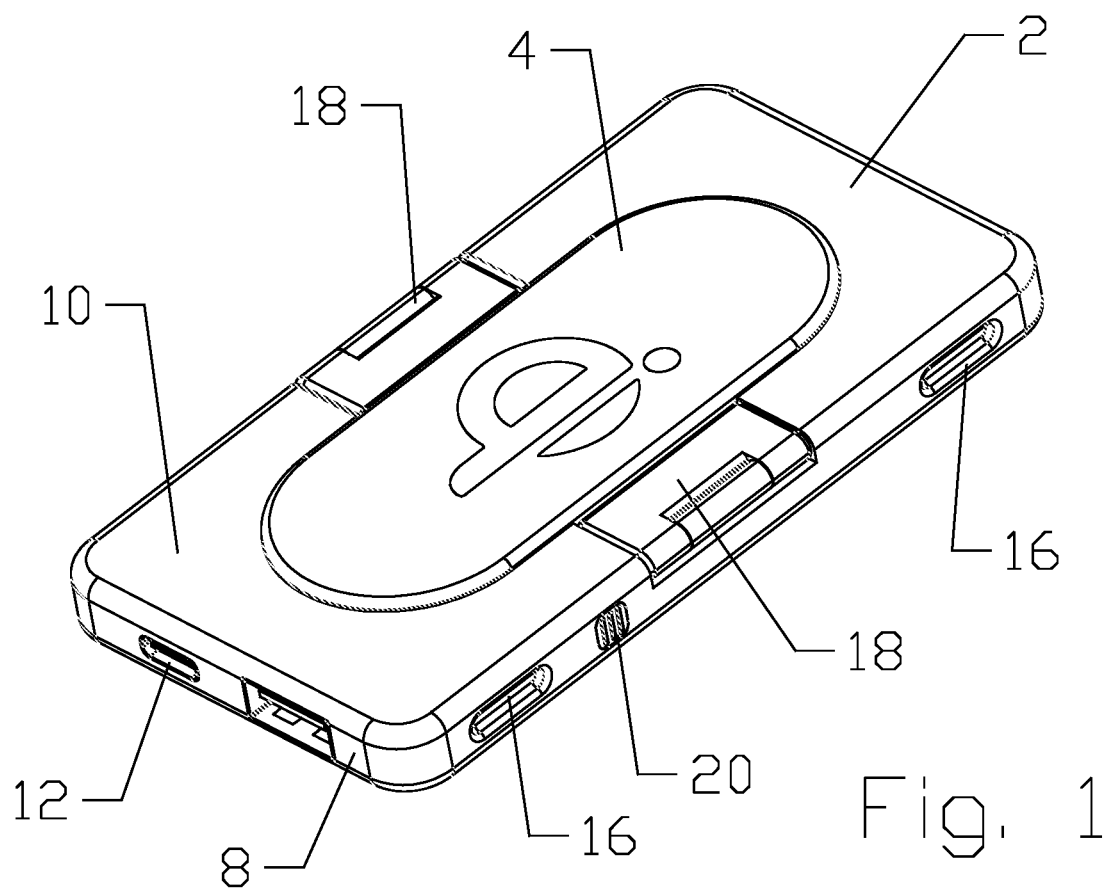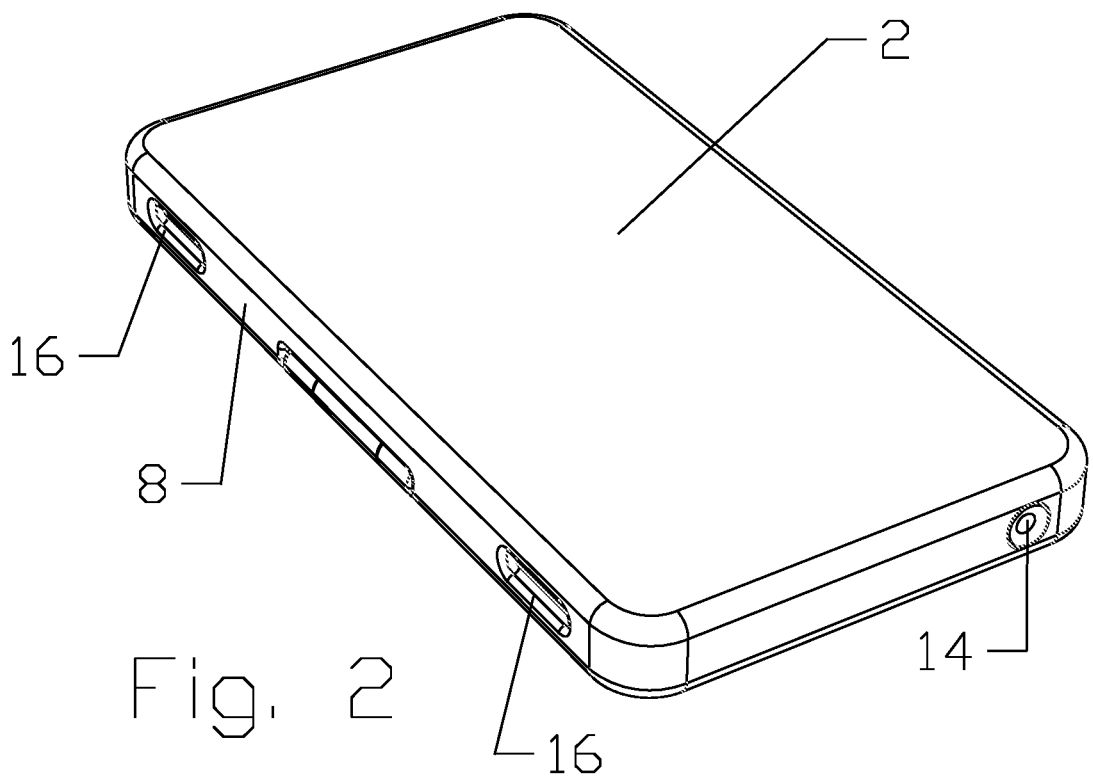

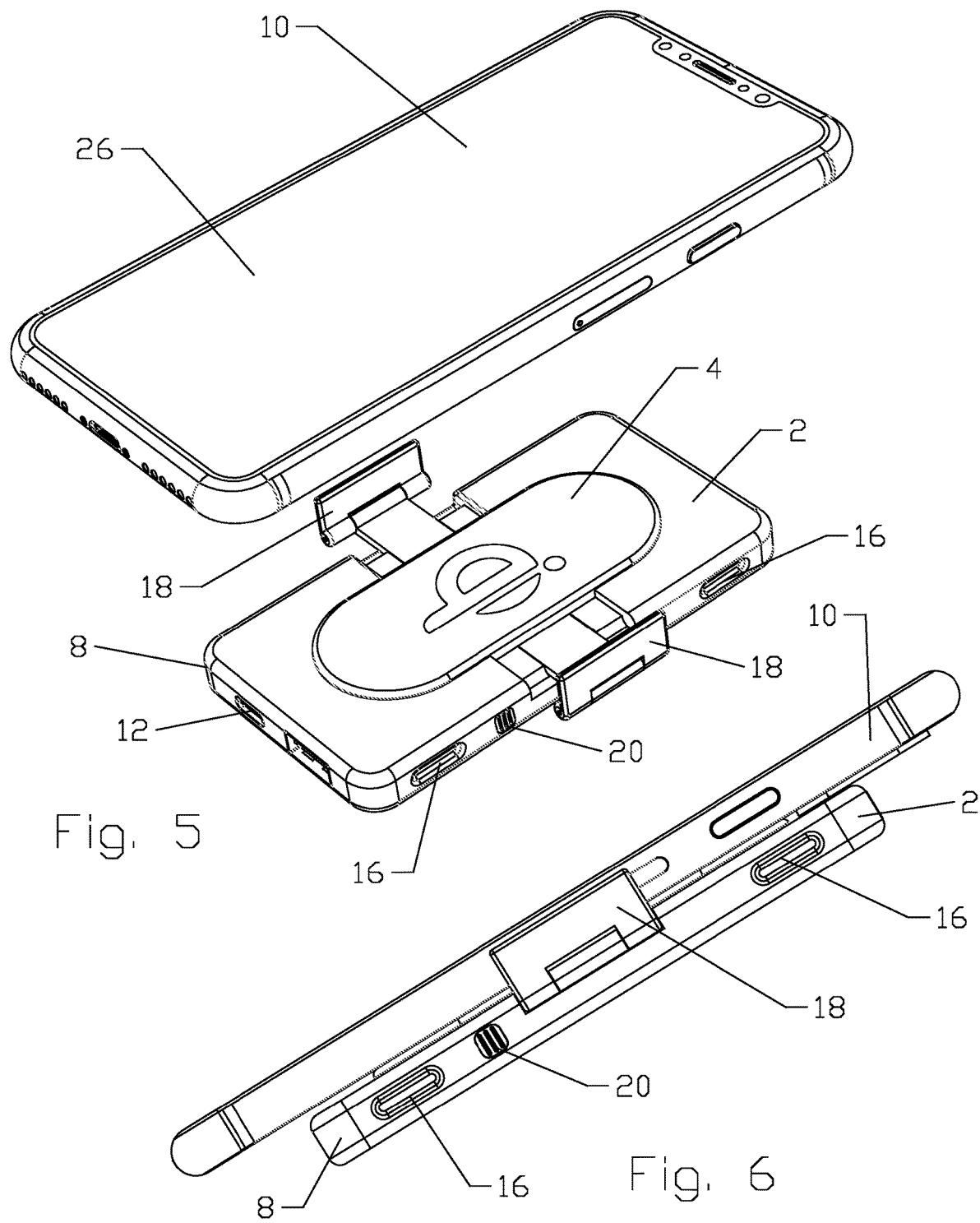

MODULAR WIRELESS POWER BANK SYSTEM

CROSS-REFERENCE TO RELATED APPLICATION

This application claims the benefit of U.S. Provisional Application No. 62/805,998 filed on 15 Feb. 2019, hereby incorporated by reference in its entirety.

BACKGROUND

Field of the Invention

This invention relates to a modular wireless power bank system. More particularly, the invention relates to a power bank attachable to a wide range of electronic devices for wireless power transfer and at least a desk stand for charging the power bank, the desk stand usable alone by either the power bank or electronic device, or while the power bank is attached to the electronic device.

Description of Related Art

Increasing operating speed, functionality and operating periods of modern consumer electronics devices requires a corresponding increase in electronic device battery power capacity. A significant factor in consumer satisfaction with consumer electronics devices is ease of recharging the battery of the consumer electronics devices. Wireless magnetic inductive charging technologies enable recharging of suitably configured electronics devices without requiring mechanical interconnection via an electrical connector, significantly simplifying recharging procedures and enabling simplified/improved environmental sealing of the electronic devices.

Another problem with electronic device recharging that consumers encounter is managing a proliferation of charging/power solutions for their electronic device as they move between mobile, vehicle and office or home environments. For example, upon entering a vehicle a user typically applies a power cable connection to their electronic device which they then mount into a vehicle windshield or dashboard cradle/mounting arrangement that orients the phone for view while driving. Similarly, a separate perhaps plug-in or wireless charging base may be utilized while situated in an office or home environment for extended periods. Each of these mechanical connections and re-connections require additional hardware/cabling and introduce a significant wear factor upon electronic device itself. Ultimately, wear of the electronic device electromechanical connection points may result in premature failure of the device, incurring significant replacement cost.

The consumer electronics market for smart phones is dominated by Android and Apple devices. Although both Android and Apple smart phones configured for wireless magnetic inductive charging utilizing the QI wireless magnetic induction charging standard are available, the wireless charging technology has typically been limited to use in device specific battery packs integrated into phone cases and/or desktop charging base stations.

Therefore, an object of the invention is to provide a modular wireless power bank system solution that overcomes deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

FIG. 1 is a front isometric view of the electronic device engaging side of an exemplary power bank configured for spring arm grip interconnection.

FIG. 2 is a back isometric view of the power bank of FIG. 1.

FIG. 5 is a front isometric view of the power bank of FIG. 1 oriented for coupling with an electronic device.

FIG. 6 is a front isometric view of the power bank an electronic device of FIG. 5 coupled to one another.

DETAILED DESCRIPTION

Figure 3:
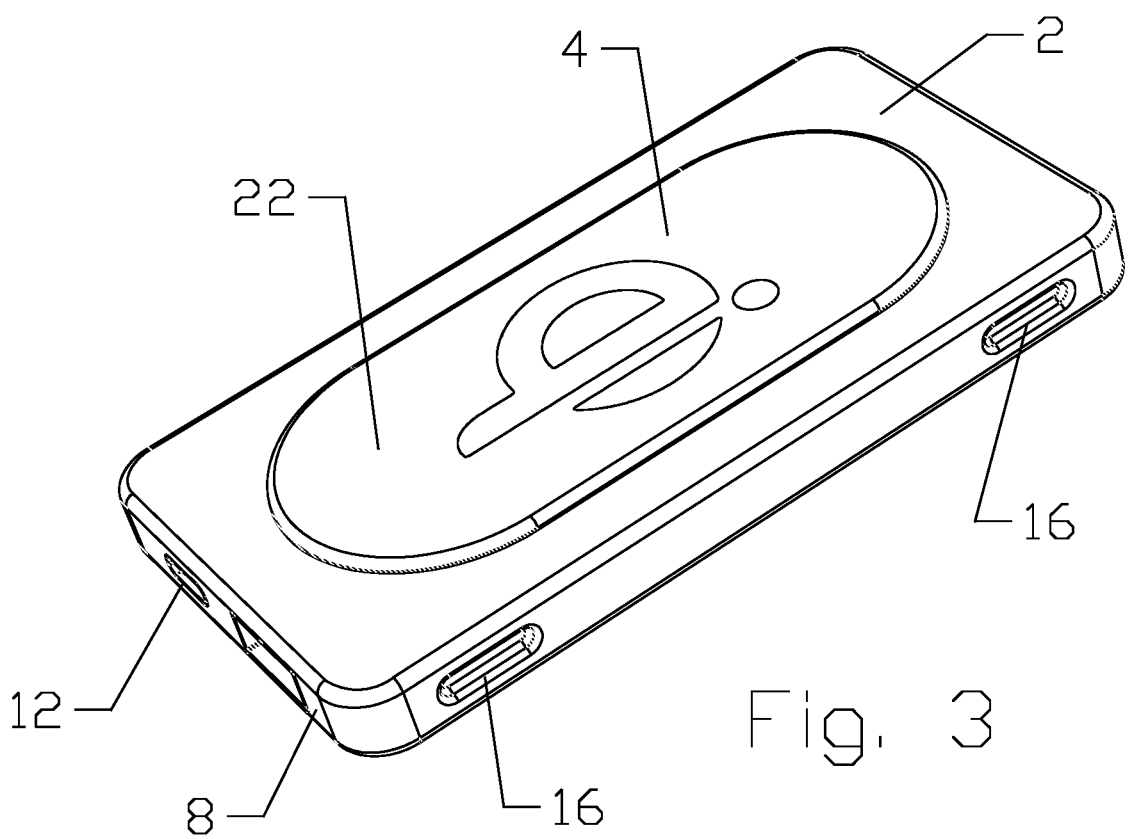
FIG. 3 is a front isometric view of the electronic device engaging side of an exemplary power bank configured for nano-suction material surface interconnection.

As shown in FIGS. 1-4, a power bank 2 with wireless magnetic induction charging, for example according to the QI wireless magnetic induction charging standard, has a charge surface 4 coupled to a battery 6 contained within an enclosure 8 dimensioned to mate the charge surface 4 against the back of the desired electronic device 10. The enclosure 8 is fitted with input and/or output power bank electromechanical connectors 12, for example USB-C, USB-A and/or proprietary interfaces. Thus, the power bank 2 may also be charged and/or charge other devices via direct connection as a conventional power bank. A power switch 14 may also be provided on the enclosure to enable/disable the power bank 2. The enclosure 8 may also be provided with mount connection points, such as depressions 16 or dimples around the enclosure periphery for securing the power bank 2 (and any electronic device 10 it is attached to) to cradles or stands, for example to a vehicle mount configured for windshield and/or dashboard mounting.

The power bank of FIGS. 1 and 2 is attachable to a desired electronic device 10 via hinged clamp arms 18 that swing out and are biased by spring(s) to a closed position, extendable against the spring bias to extend and securely grip the sides of a desired electronic device, as shown for example in FIGS. 5 and 6. A clamp release button 20 provided on the enclosure 8 disengages the hinge clamp arms 18 for ease of extension and attachment to the electronic device 10.

Figure 4:
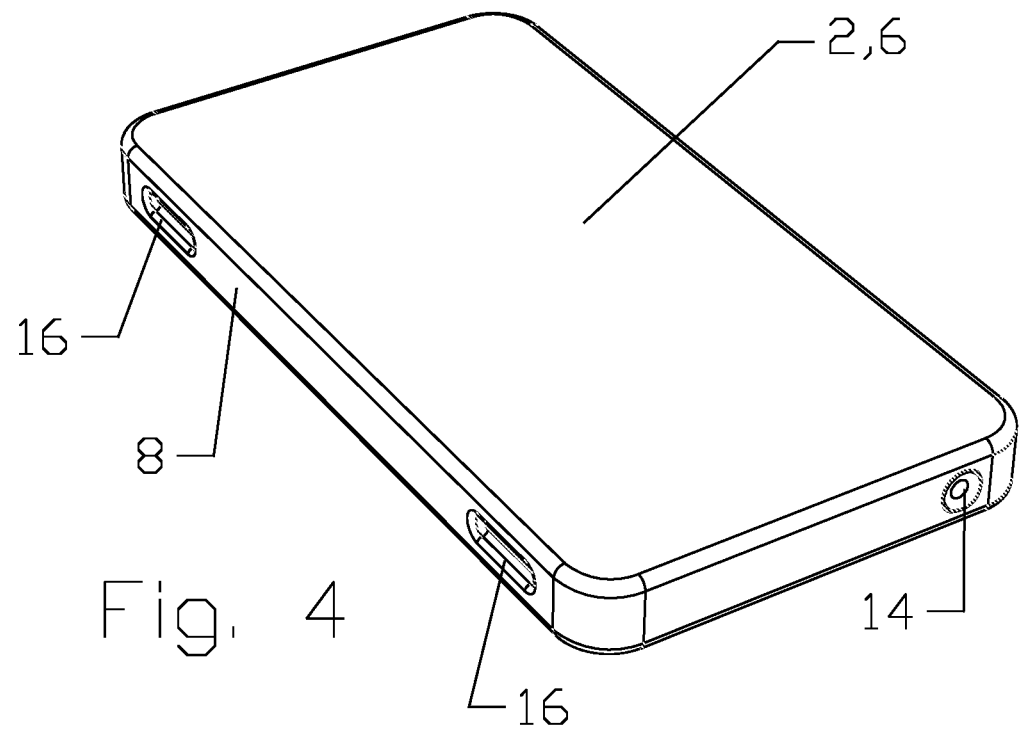
FIG. 4 is a back isometric view of the power bank of FIG. 3.
Figure 7:
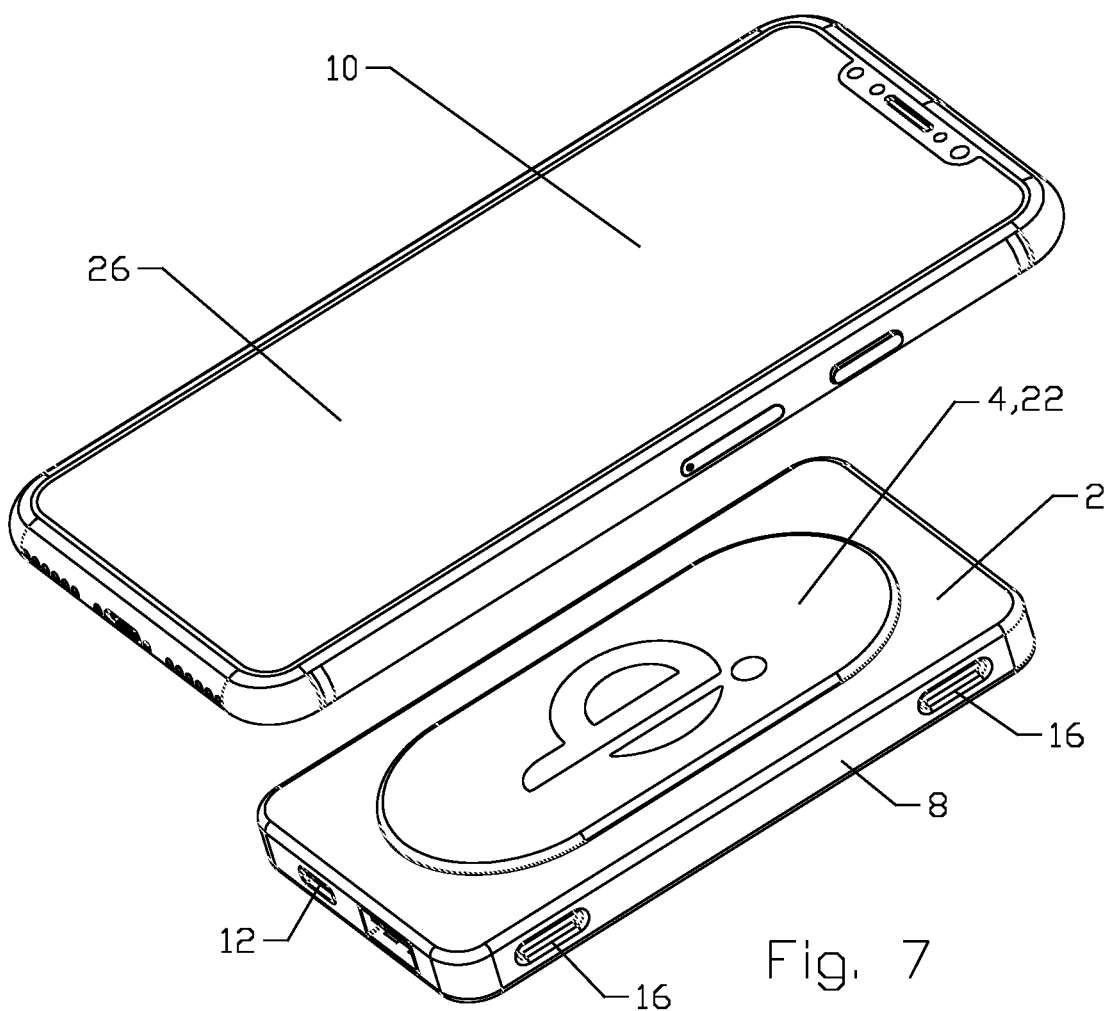
FIG. 7 is a front isometric view of the power bank of FIG. 3 oriented for coupling with an electronic device.
Figure 8:
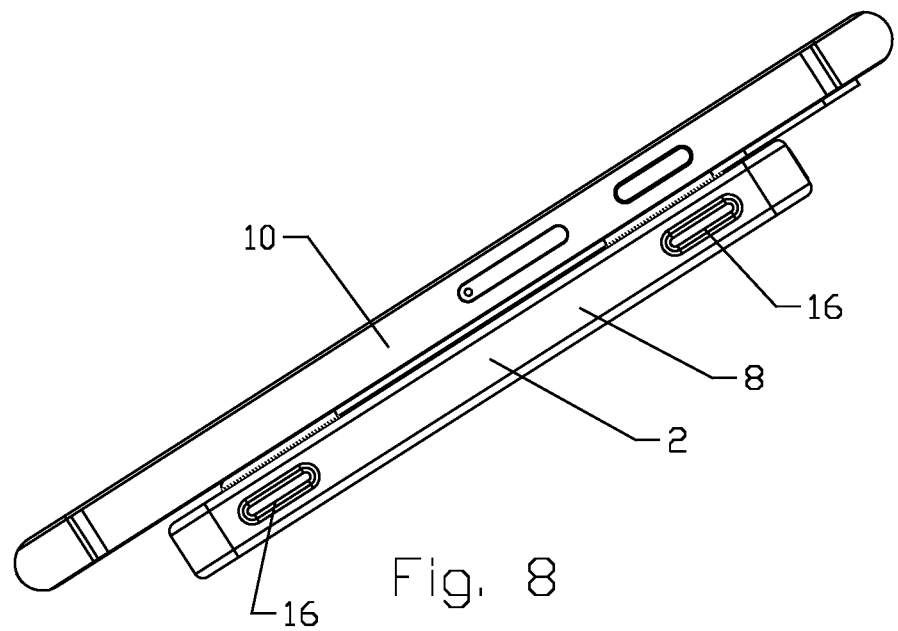
FIG. 8 is a front isometric view of the power bank and electronic device of FIG. 7 coupled to one another.
Figure 9:
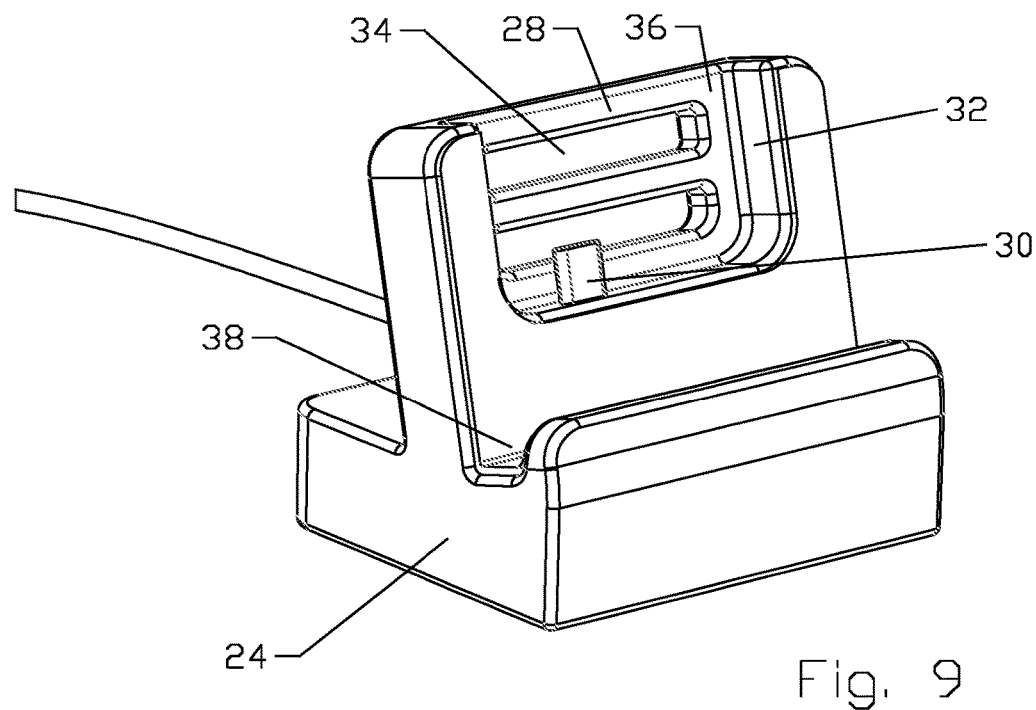
FIG. 9 is a front isometric view of an exemplary desk stand.
Figure 10:
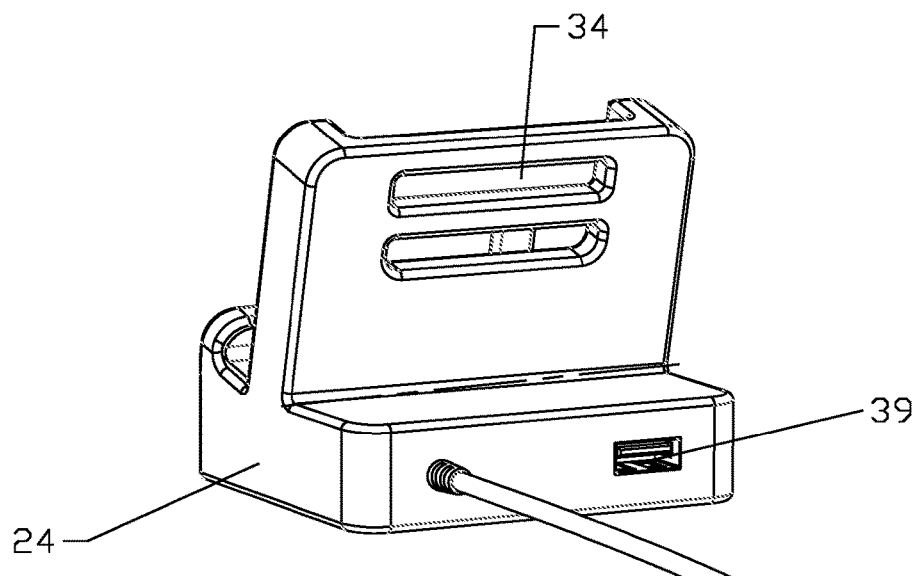
FIG. 10 is a back isometric view of the desk stand of FIG. 9.
Figure 11:
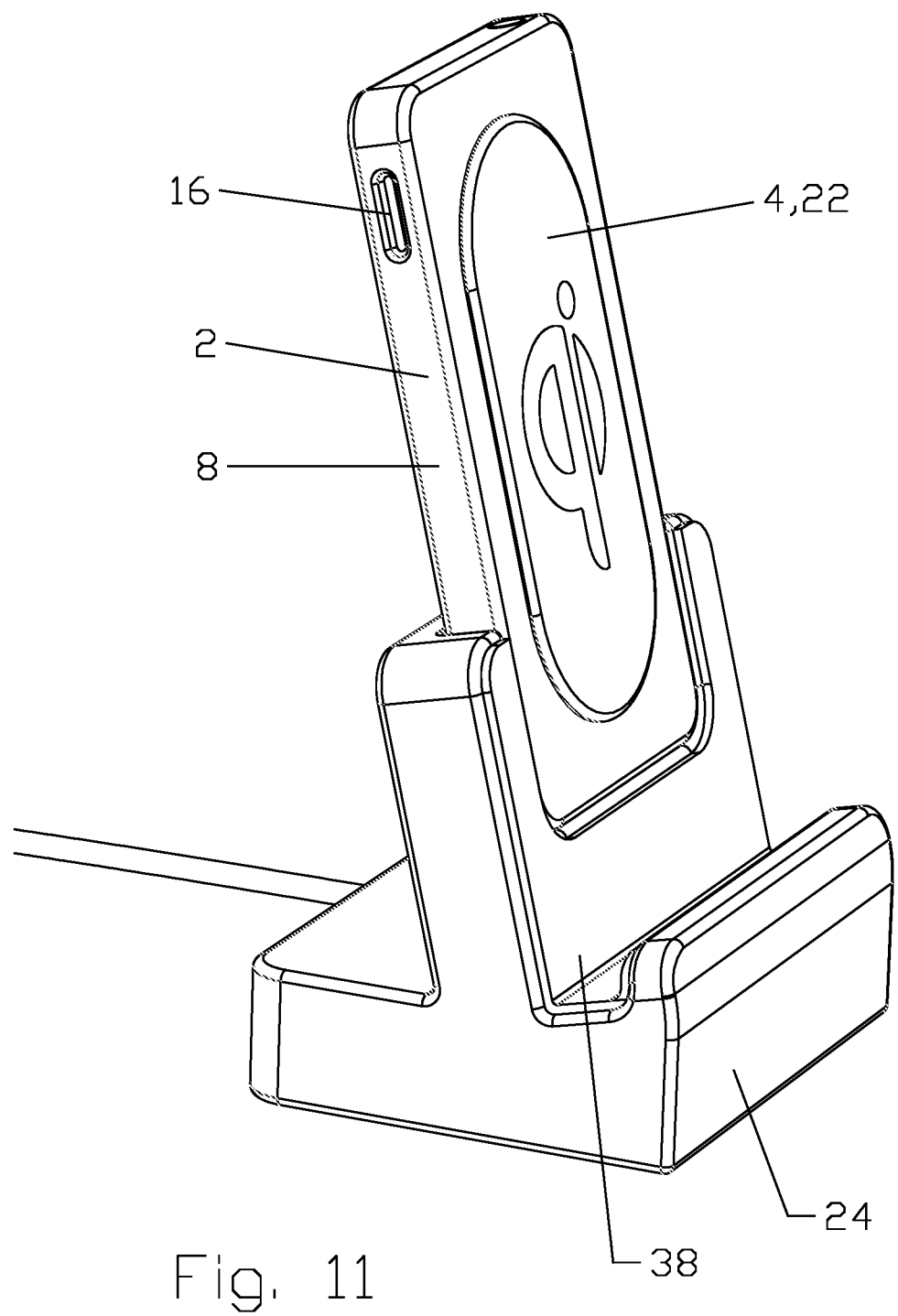
FIG. 11 is a front isometric view of the desk stand of FIG. 9, with a power bank seated within the power bank socket.

The power bank 2 of FIGS. 3-4 may be alternatively attachable via, for example, a nano-suction material surface 22 of the power bank 2 operative as a reusable adhesive surface for securing the power bank 2 to an electronic device 10. The nano suction material utilizes vacuum, negative fluid pressure and a plurality of nano-sized suction cups to securely adhere to a corresponding non-porous surface. As shown in FIGS. 7 and 8, upon mating against the non-porous surface each of the plurality of miniature suction cups each create a small vacuum, together generating a large suction force which retains the power bank 1 against the desired electronic device 10. The power bank 2 may be separated from the electronic device 10 by carefully prying them apart, overcoming the large suction force. Therefore, the nano-suction material 22 is operative as a reusable secure adhesive without residue or fouling.

In further embodiments, both the clamp arms 18 and the nano-suction material surface 22 and/or further attachment means that may be available may be utilized, providing secure attachment of the power bank 2 to the widest possible types and range of sizes of electronic device(s) 10.

Once the power bank 2 is securely attached to the electronic device 10, the power bank 2 may be activated at which time wireless induction charging logic of the power bank 2 interfaces with similar logic of the electronic device 10, enabling the power bank 2 to wirelessly charge the battery of the electronic device 10. Because the power bank 2 is securely attached and the enclosure 8 is relatively slim, the power bank 2 and electronic device 10 may be treated as a common unit with minimal additional weight or complexity, significantly extending the operating time of the electronic device 10 by the additional battery capacity of the power bank 2. Notably this additional utility is realized without requiring utilization of an electromechanical connector of the electronic device 10. Further, the power bank 2 is usable with a wide range of different electronic devices 10, such as any wireless chargeable electronic device 10 with a width graspable by the extendable range of the clamp arms 18 (embodiment of FIGS. 1 and 2) and/or which has a non-porous surface proximate the charge surface of the electronic device 10 (embodiment of FIGS. 3 and 4).

Figure 12:
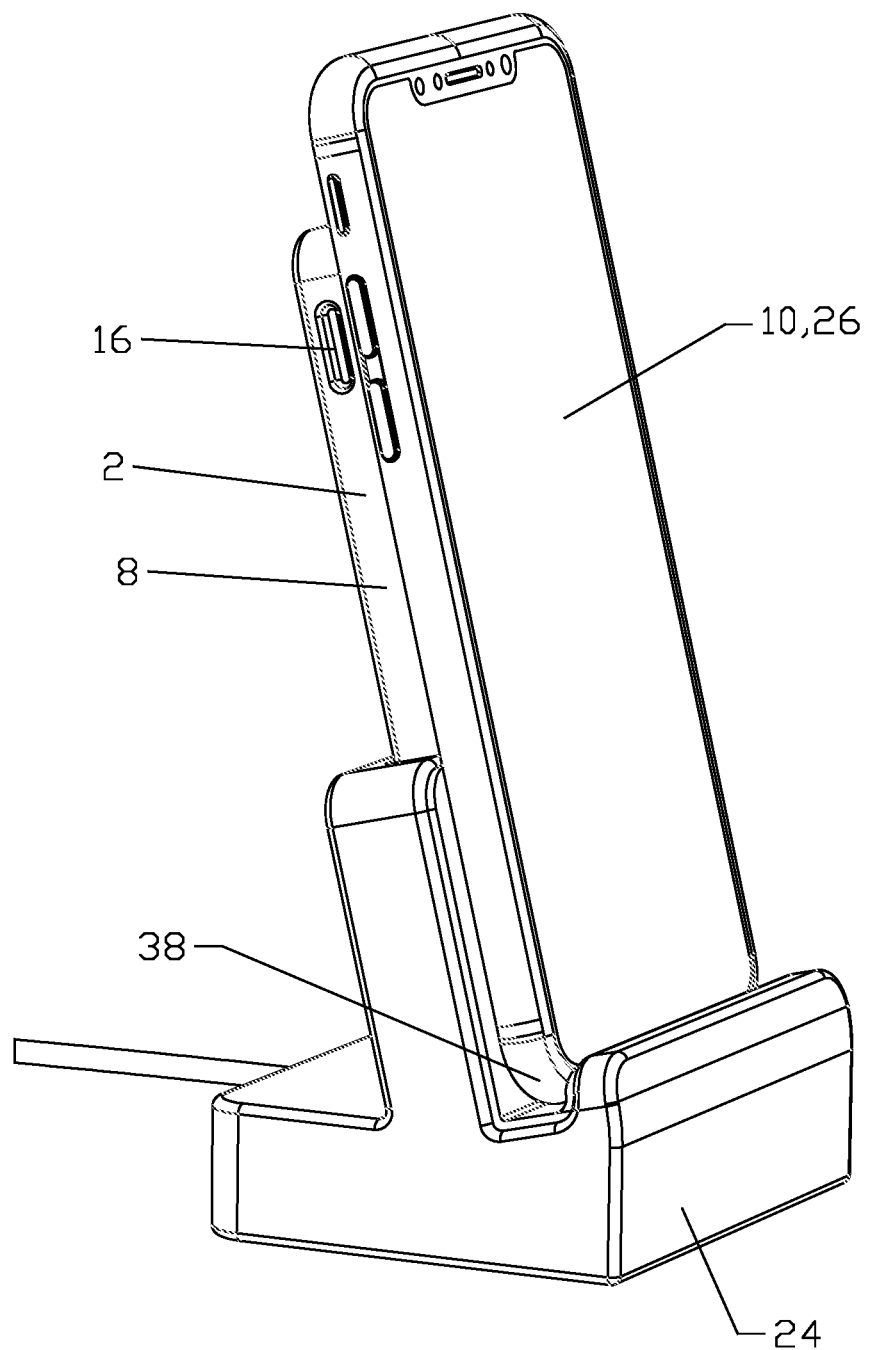
FIG. 12 is a front isometric view of the desk stand and power bank of FIG. 11, with an electronic device seated in the electronic device cradle.
Figure 13:
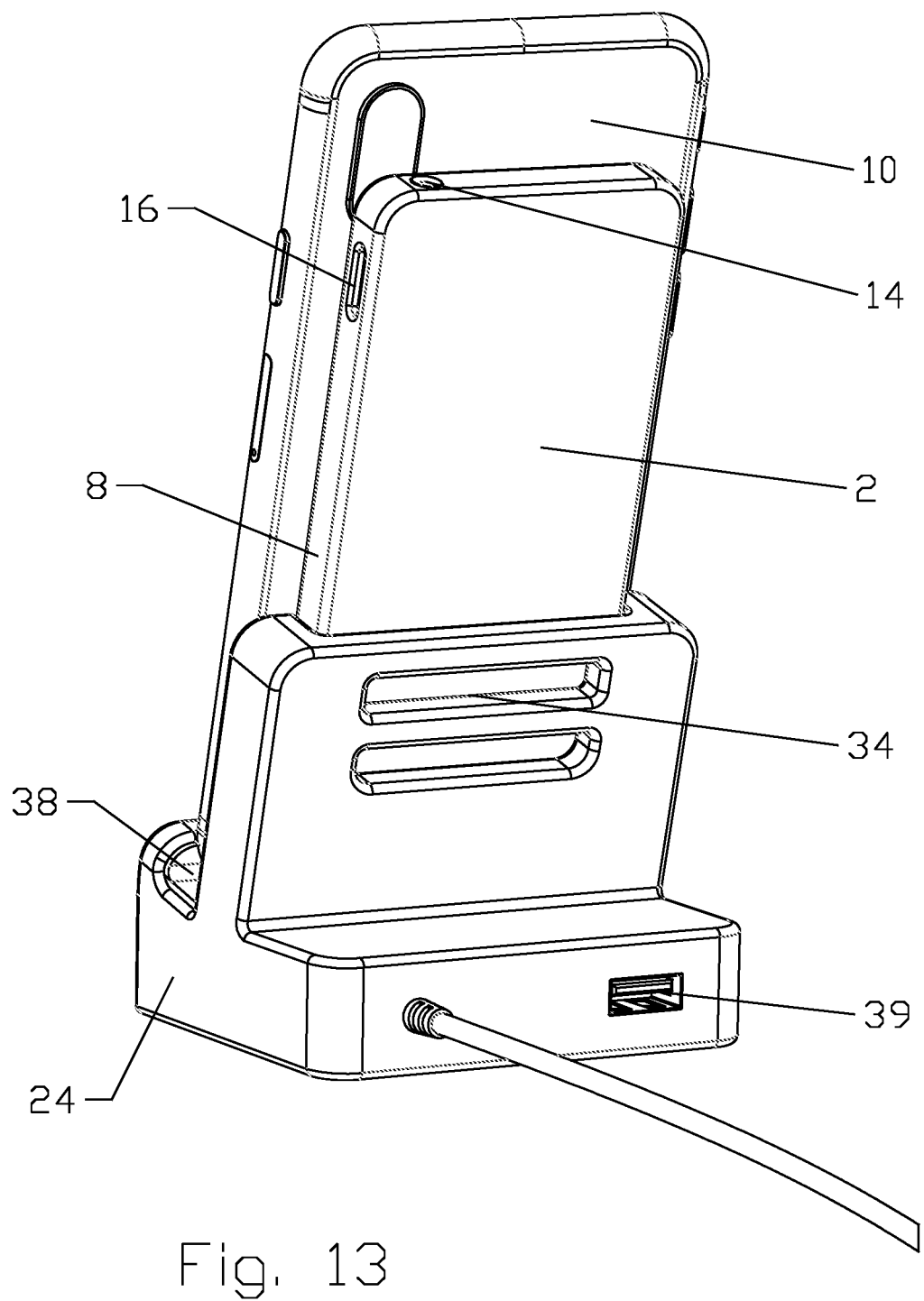
FIG. 13 is a back isometric view of the desk stand, power bank and electronic device of FIG. 12.

The power bank 2 may also be utilized with a desk stand 24, as shown for example in FIGS. 9-13. The desk stand 24 is operative both as a charger for the power bank 2 and as a support for the electronic device 10, orienting the electronic device 10 in an upright position for ease of viewing the electronic device screen 26, for example, while one is working at a desk or when the desk stand 24 is placed on a bedroom side table, for ready access as the power bank 2 is charged, for example, overnight. The desk stand 24 is configured for use alone with the power bank 2 (FIG. 11), by the electronic device 10 alone or while the power bank 2 is secured to the electronic device 10 (FIGS. 12 and 13).

A power bank socket 28 is dimensioned to receive the power bank 2, the power bank socket 28 including a stand electromechanical connector 30 aligned to mate with the power bank electromechanical connector 12 upon insertion of the power bank 2 into the power bank socket 28. The desk stand 24 may include guide slots 32 (see FIG. 9) into which the power bank 2 is inserted there along, aligning the power bank electromechanical connector 12 to easily mate with stand electromechanical connector 30 with minimal chance of damage to the connectors. Vents 34 may be applied to a backstop surface 36 of the desk stand (See FIGS. 9 and 13), to release heat that may be generated via quick recharging of the power bank 2 and/or wireless charging from the power bank 2 to an attached electronic device 10. An electronic device cradle 38 is dimensioned to receive and support the electronic device. The power bank socket 28 and the electronic device cradle 38 are aligned with respect to one another to receive the power bank and the electronic device either separately or while the power bank 2 is coupled to the electronic device 10. The electronic device cradle 38 may be padded for seating of the electronic device 10 without scratching or undue force upon the power bank 2 and desk stand 24 electromechanical interconnection.

The charge level of an attached electronic device 10 may be prioritized. For example, where an electronic device 10 is present/coupled to the power bank 2, the electronic device 10 may be charged first by the power bank 2. If and/or when the electronic device 10 is fully charged, the power bank 2 itself is then charged (via the desk stand 24 or other direct connected power source, as in the vehicle mount 40). The desk stand 24 may further include auxiliary output ports 39 such as USB-C, USB-A or proprietary interfaces, enabling the desk stand 24 to charge additional devices, eliminating the need for additional wall plugs or interfering power bricks when multiple devices are being charged (see FIGS. 10 and 13).

A vehicle mount 40 may be utilized to secure the power bank 2 and/or electronic device 10 to a mounting surface, such as a windshield, dashboard or vent surface of a vehicle, as shown for example in FIGS. 14-23. The vehicle mount 40 has a vehicle cradle 42 with a power bank retention portion 44 and an electronic device retention portion 46, the power bank retention portion 44 and the electronic device retention portion 46 aligned to receive the power bank 2 and the electronic device 10 either separately or while the power bank 2 is coupled to the electronic device 10. A mount portion 48 is coupled to the vehicle cradle 42, the mount portion 48 configured to retain the vehicle mount 40 upon the desired mounting surface.

Figure 14:
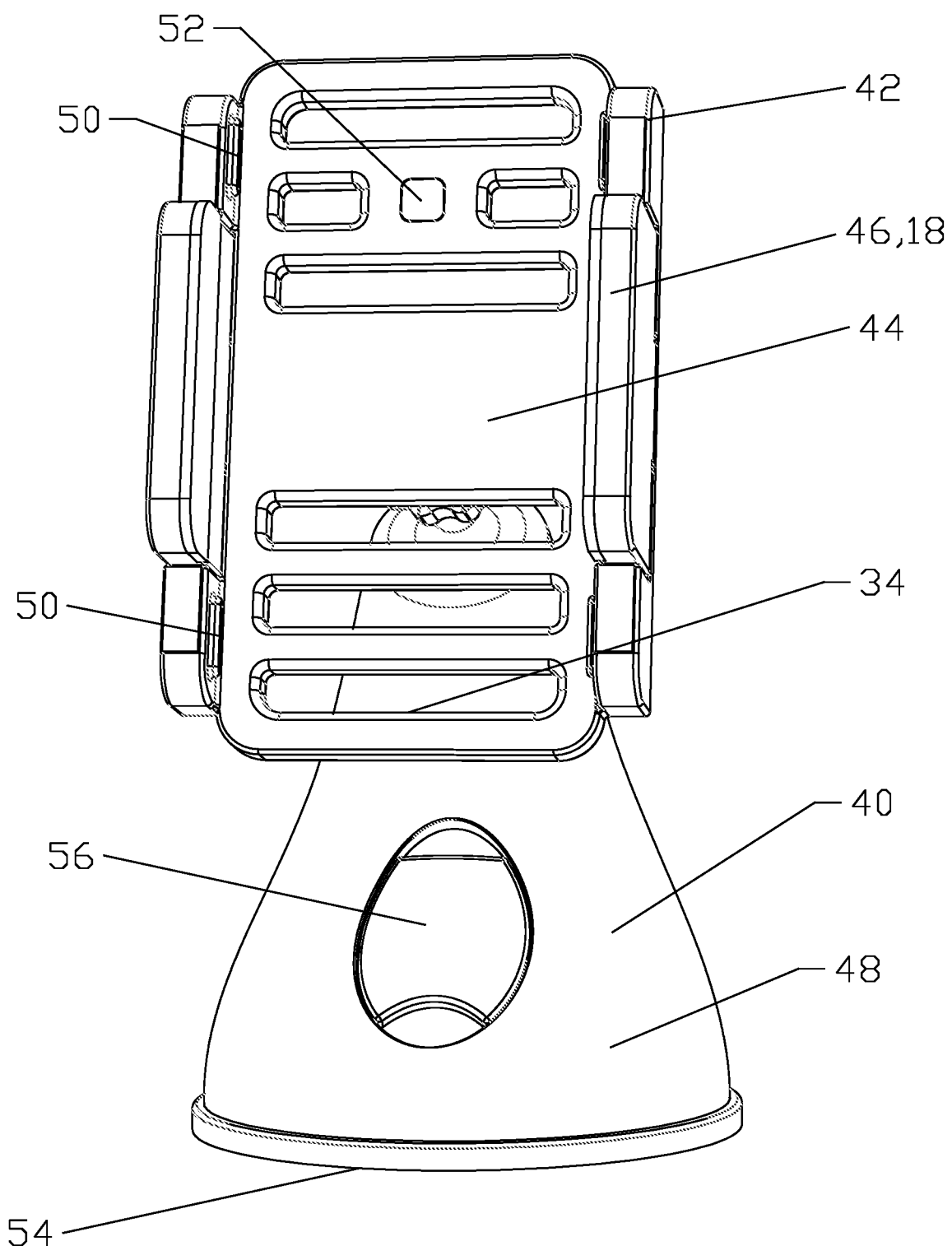
FIG. 14 is a front isometric view of a vehicle mount.
Figure 15:
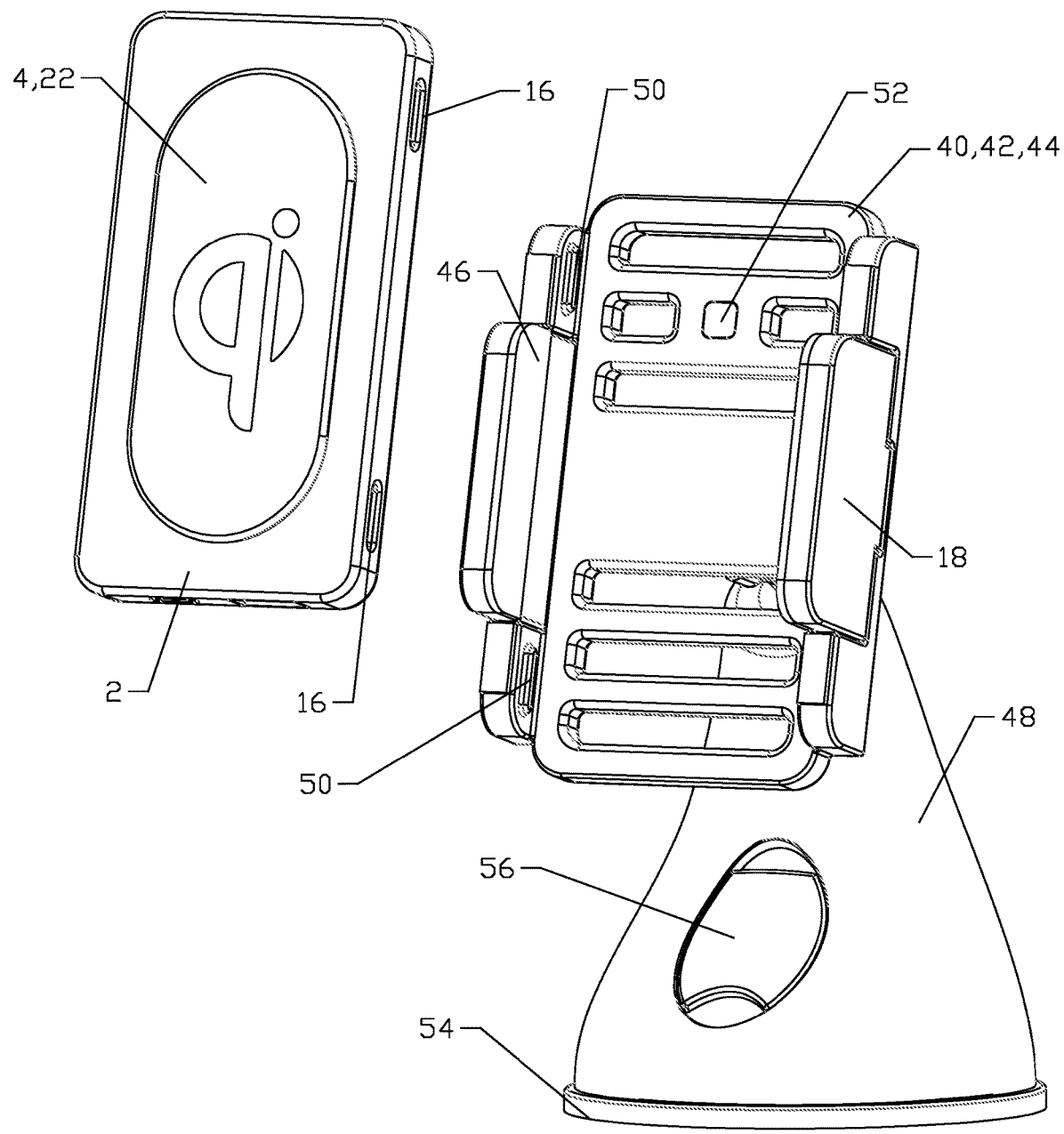
FIG. 15 is a front isometric view of the vehicle mount of FIG. 14 with a power bank oriented for coupling with the power bank retention portion.
Figure 16:
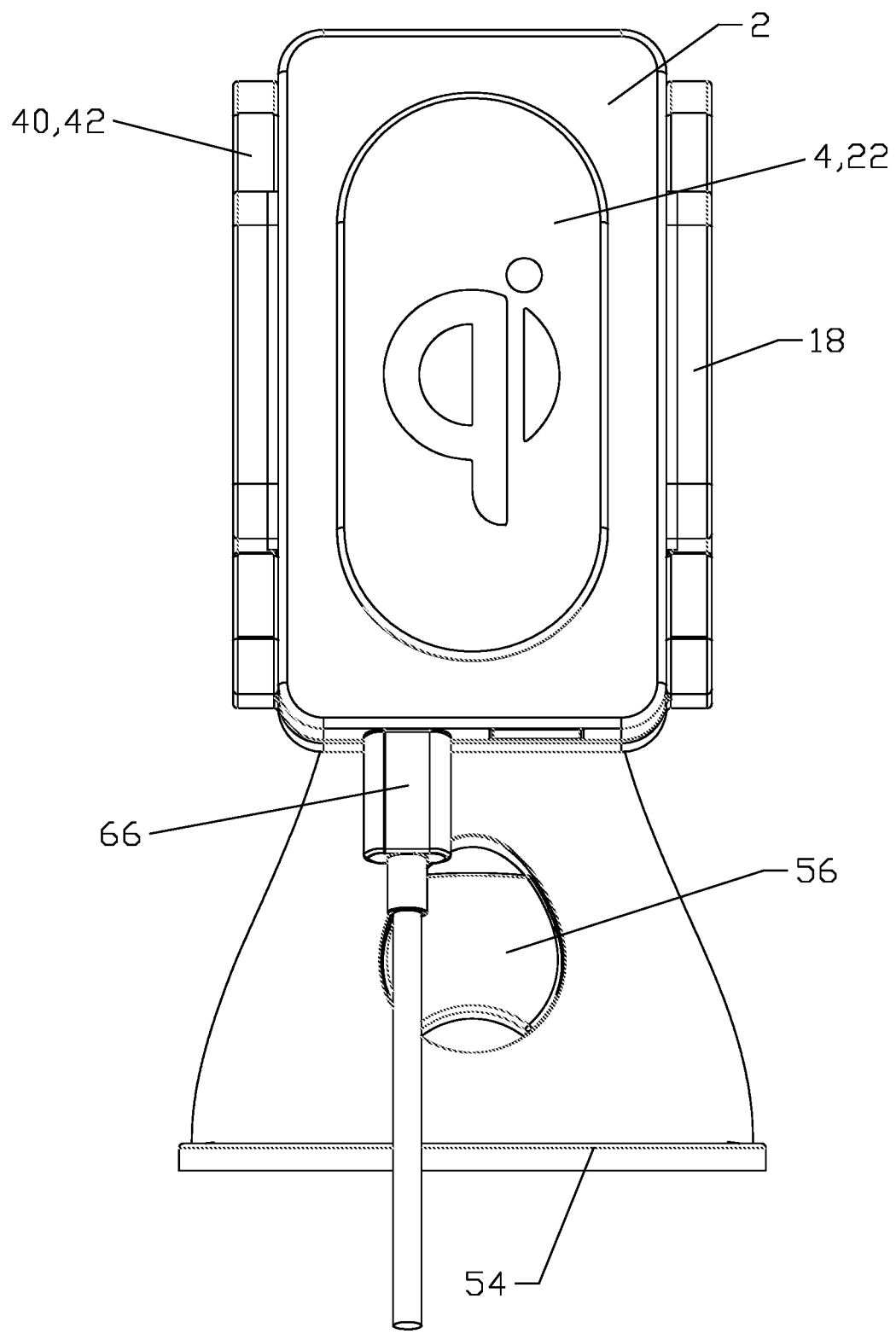
FIG. 16 is a front isometric view of the vehicle mount of FIG. 14 with the power bank seated in the power bank retention portion and power connection attached.

As best shown in FIGS. 14-16, the vehicle cradle 42 is configured to receive and retain the power bank 2 securely, for example, via keying between protrusions 50 of the power bank retention portion 44 and depressions 16 provided around a periphery of the power bank enclosure 8. One skilled in the art will appreciate that due to the keying between the power bank and the power bank retention portion 44, the power bank 2 further coupled to the electronic device 10 as described herein above, provides a more secure retention of an electronic device 10 to the vehicle mount 40 than may be available from conventional vehicle mount spring biased arms grasping the smooth edge of an electronic device alone. A power bank ejection button 52 (see FIGS. 15, 17 and 18) may be utilized to urge the power bank 2 out and away from the vehicle mount 40, for ease of disengaging the power bank 2 from the vehicle mount 40. The electronic device retention portion 46 of the vehicle mount 40 may also be provided with spring-loaded clamp arms 18 (as described with respect to the power bank 2 herein above) for gripping the periphery of the electronic device 10 with additional security or when the vehicle mount 40 is being utilized with an electronic device 10 without the power bank 2 being present. Thereby, different electronic devices 10 with a wide range of dimensions may be secured within the electronic device retention portion 46.

Figure 17:
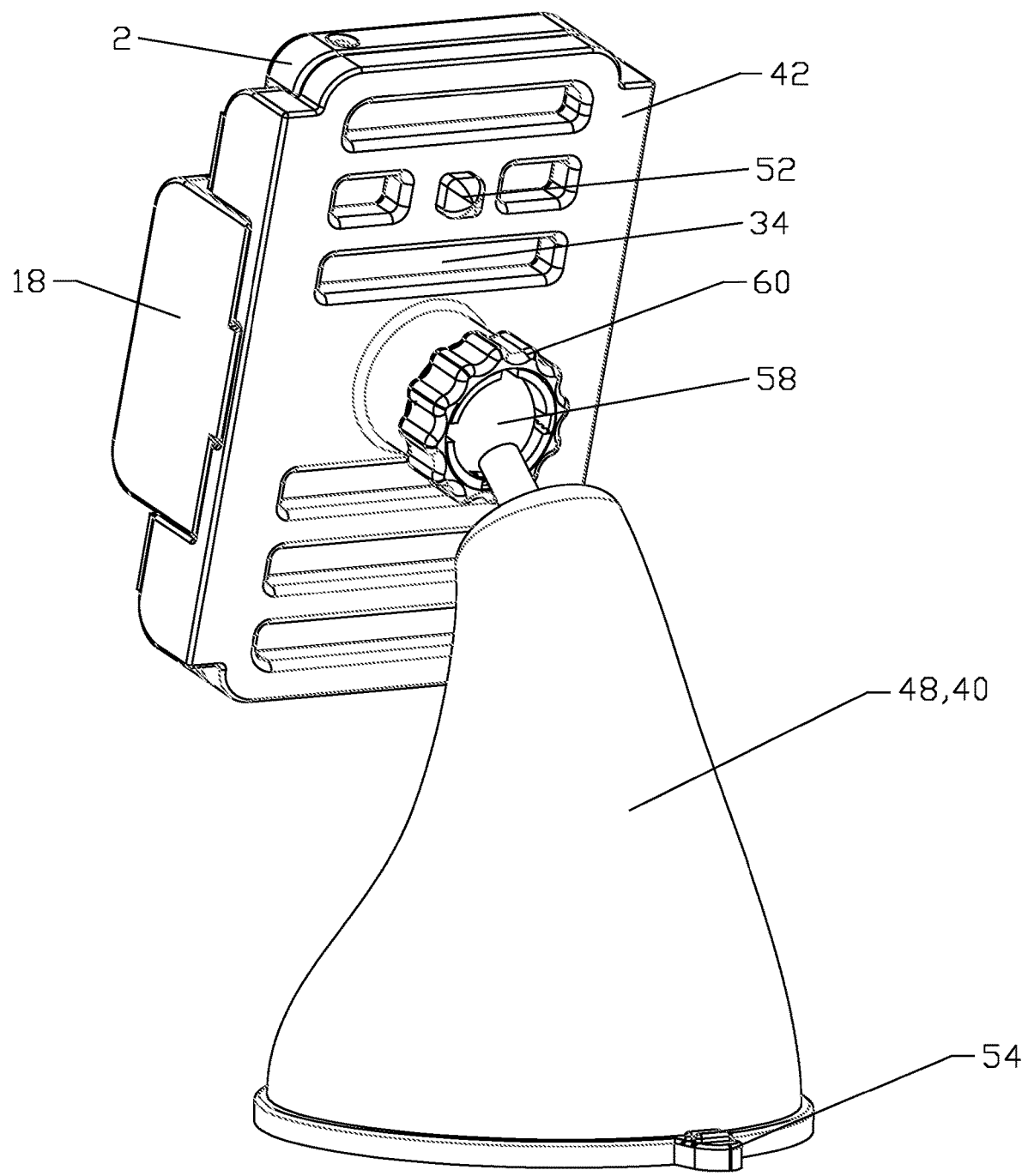
FIG. 17 is a back isometric view of the vehicle mount and power bank of FIG. 16.
Figure 18:
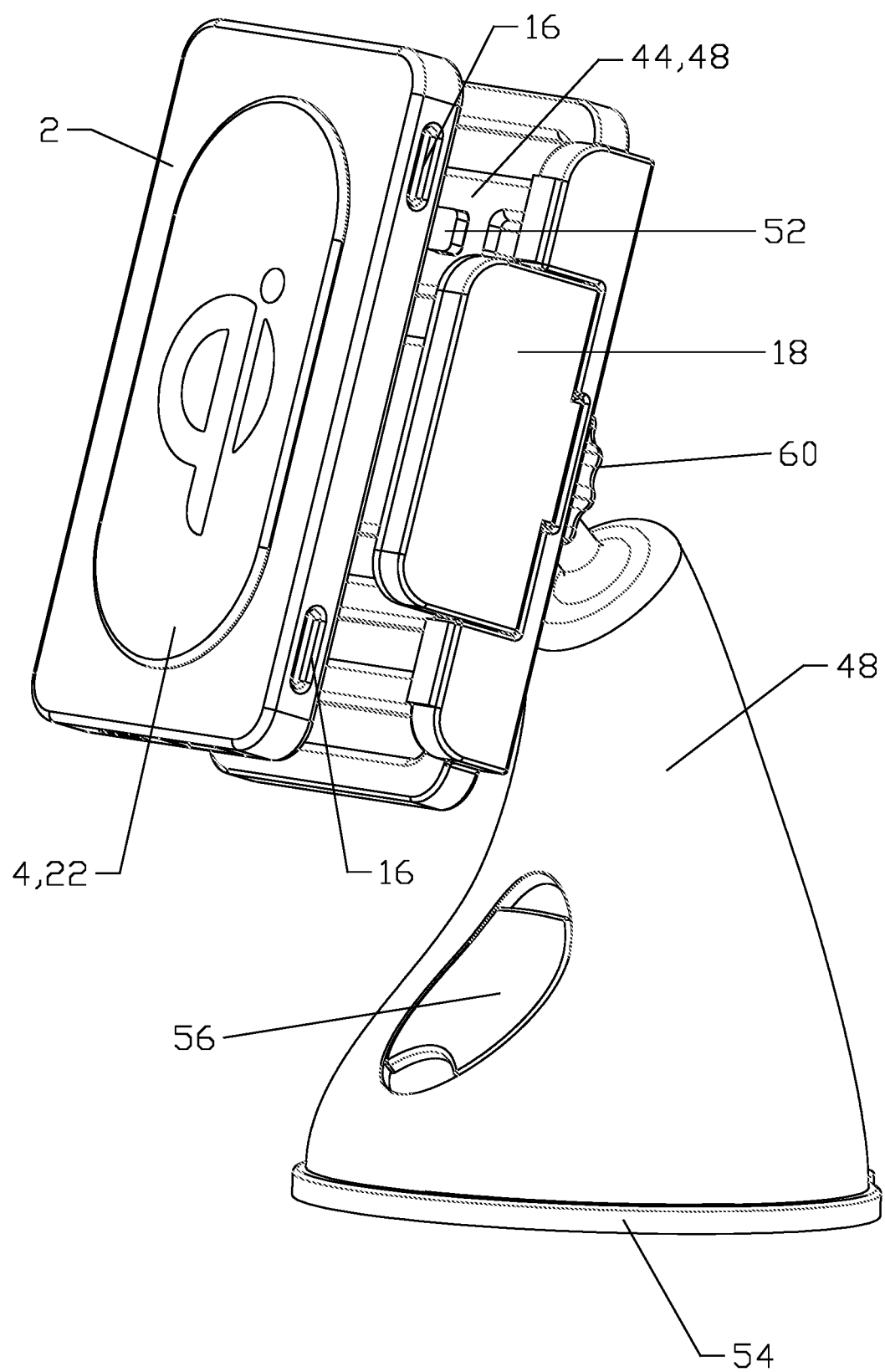
FIG. 18 is a front isometric view of the vehicle mount and power bank of FIG. 17, demonstrating ejection of the power bank from the power bank retention portion via the power bank ejection button.
Figure 19:
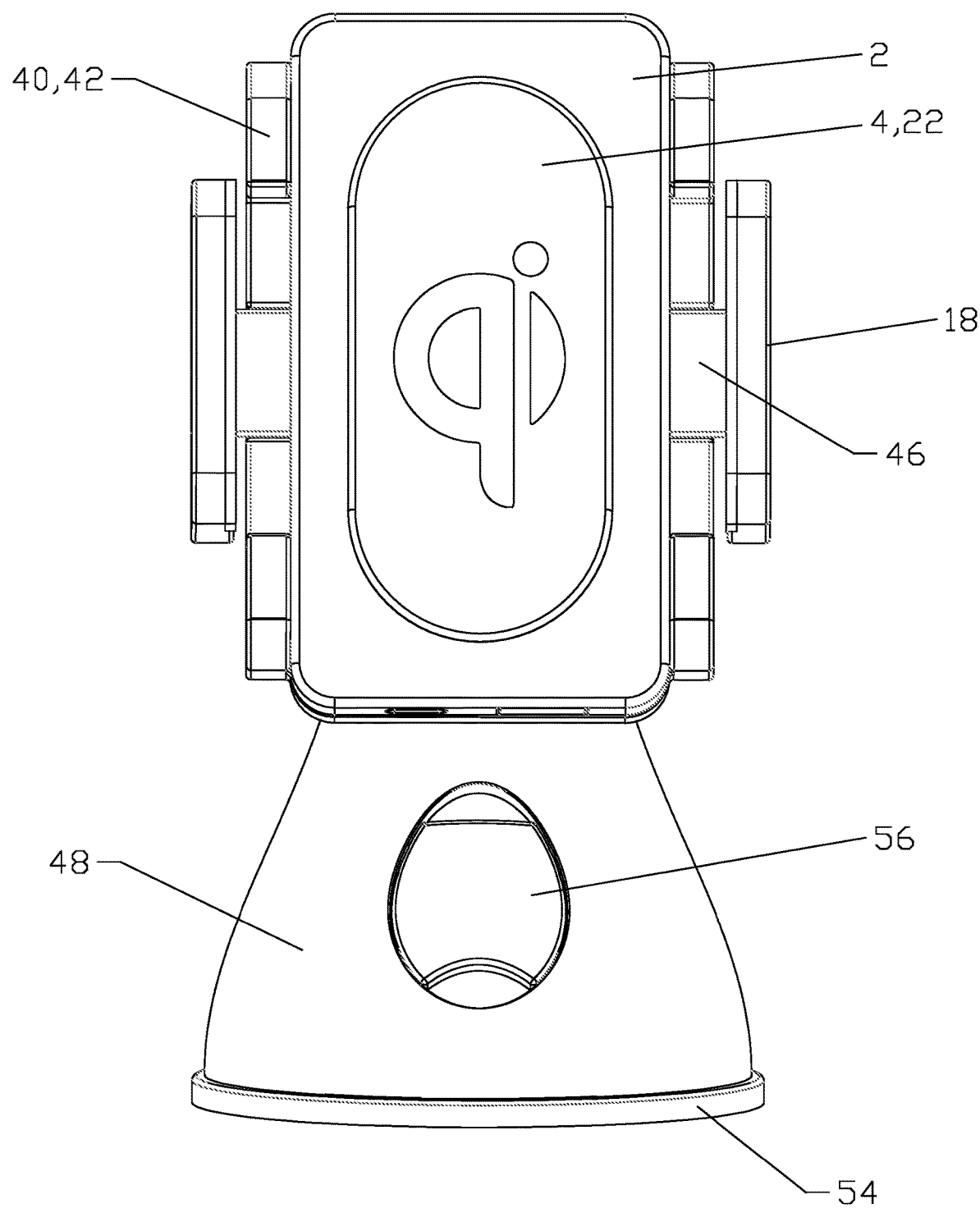
FIG. 19 is a front isometric view of the vehicle mount and power bank of FIG. 16, with clamp arms extended for receiving an electronic device into the electronic device retention portion.
Figure 20:
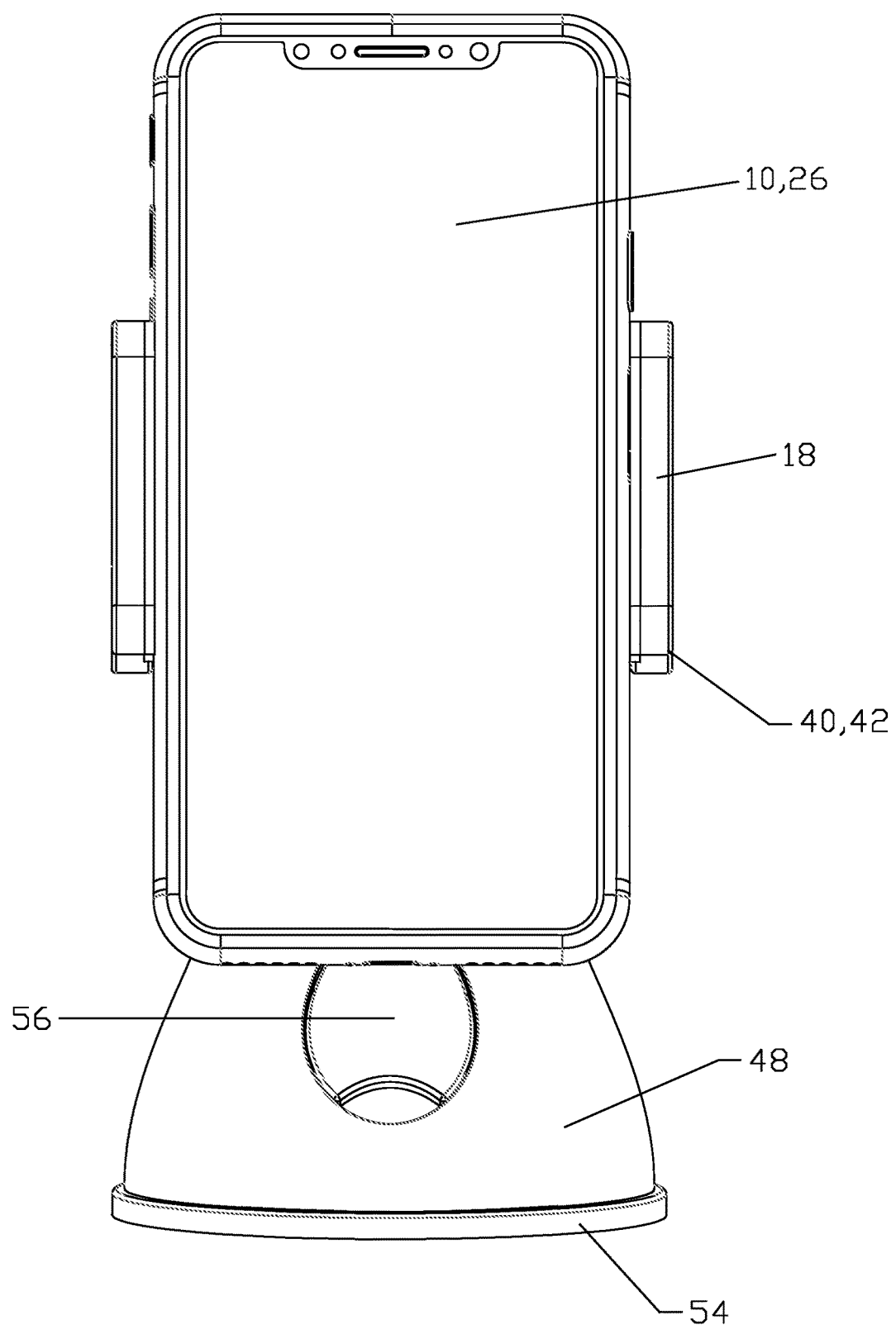
FIG. 20 is a front isometric view of the vehicle mount and power bank of FIG. 16, with an electronic device seated in the electronic device retention portion, demonstrating vertical orientation.
Figure 21:
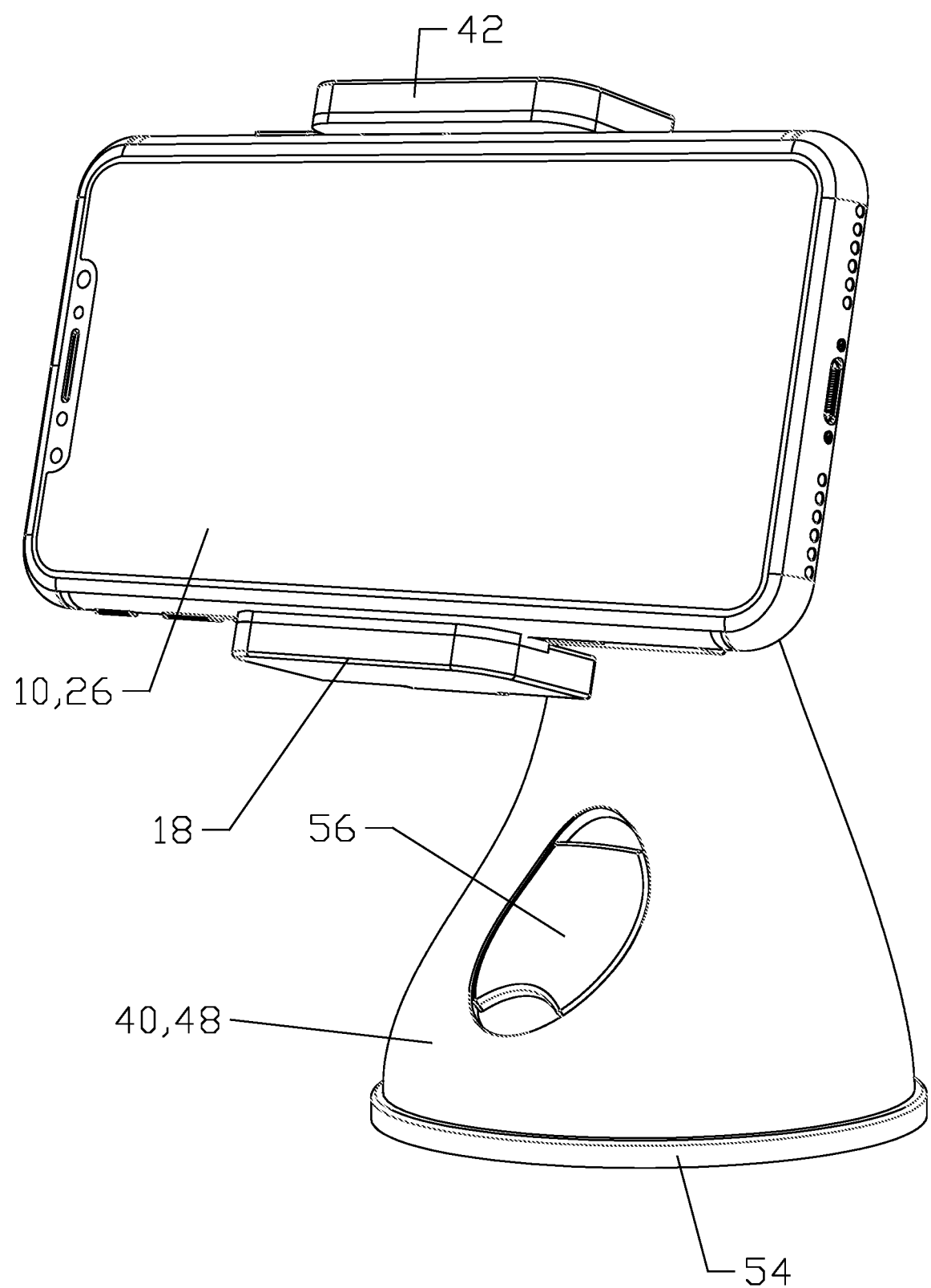
FIG. 21 is a front isometric view of the vehicle mount of FIG. 20, demonstrating horizontal orientation.

As best shown in FIGS. 17 and 18, the mount portion 48 may utilize a suction cup 54 actuated, for example, by a suction cup lever 56 to secure the vehicle mount 40 to any smooth surface, such as a vehicle windshield or dashboard. A ball joint 58, securable for example by a threaded tightening ring 60, between the vehicle cradle 42 and the electronic device cradle 42 enables a wide range of angular smooth surface (windshield or dashboard angle) and/or viewing orientation of an attached electronic device 10 for viewing by the vehicle occupants in either portrait or landscape orientation (see also FIGS. 20 and 21).

Figure 22:
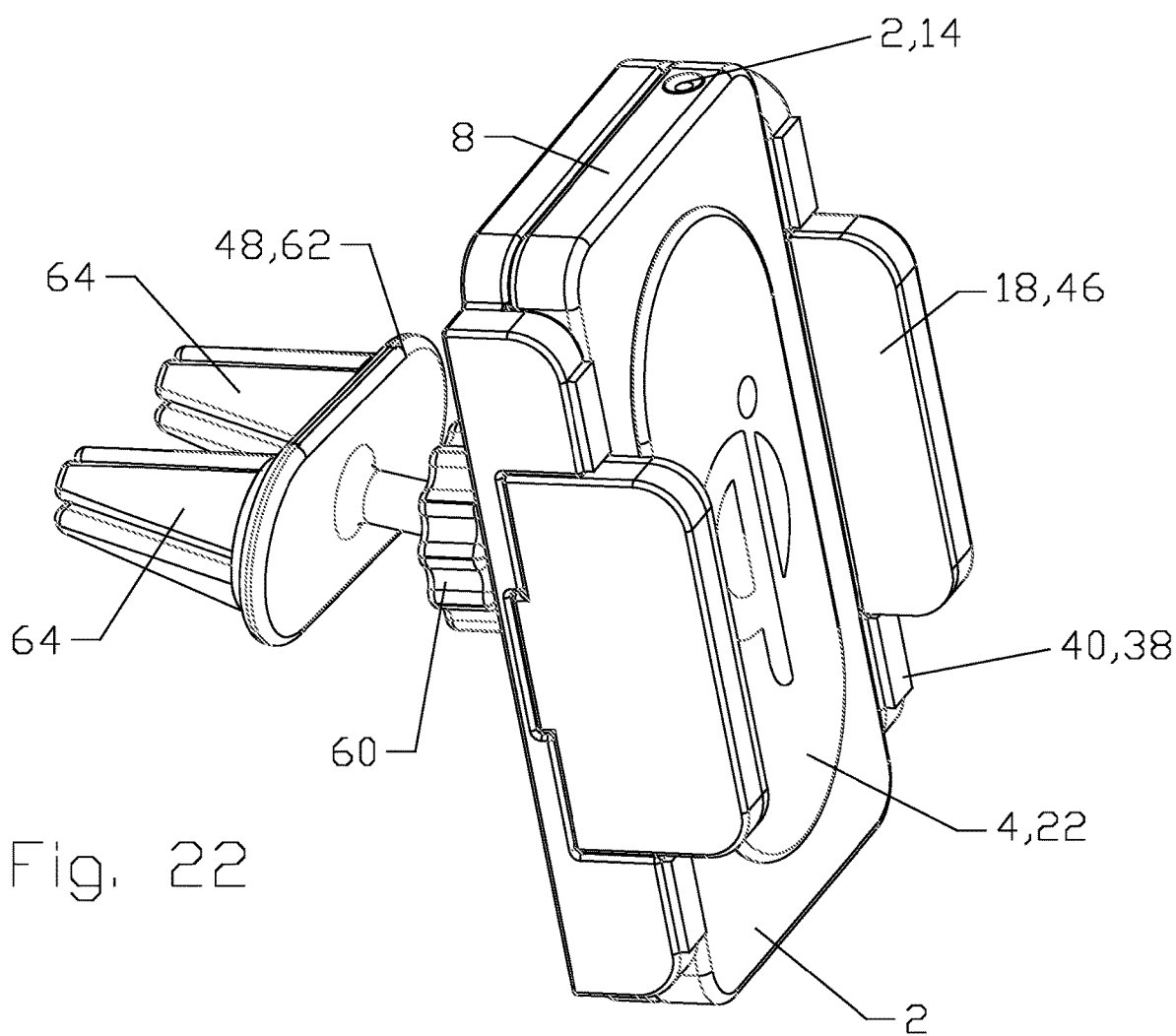
FIG. 22 is a front isometric view of a vehicle mount with a vent grip mount portion.
Figure 23:
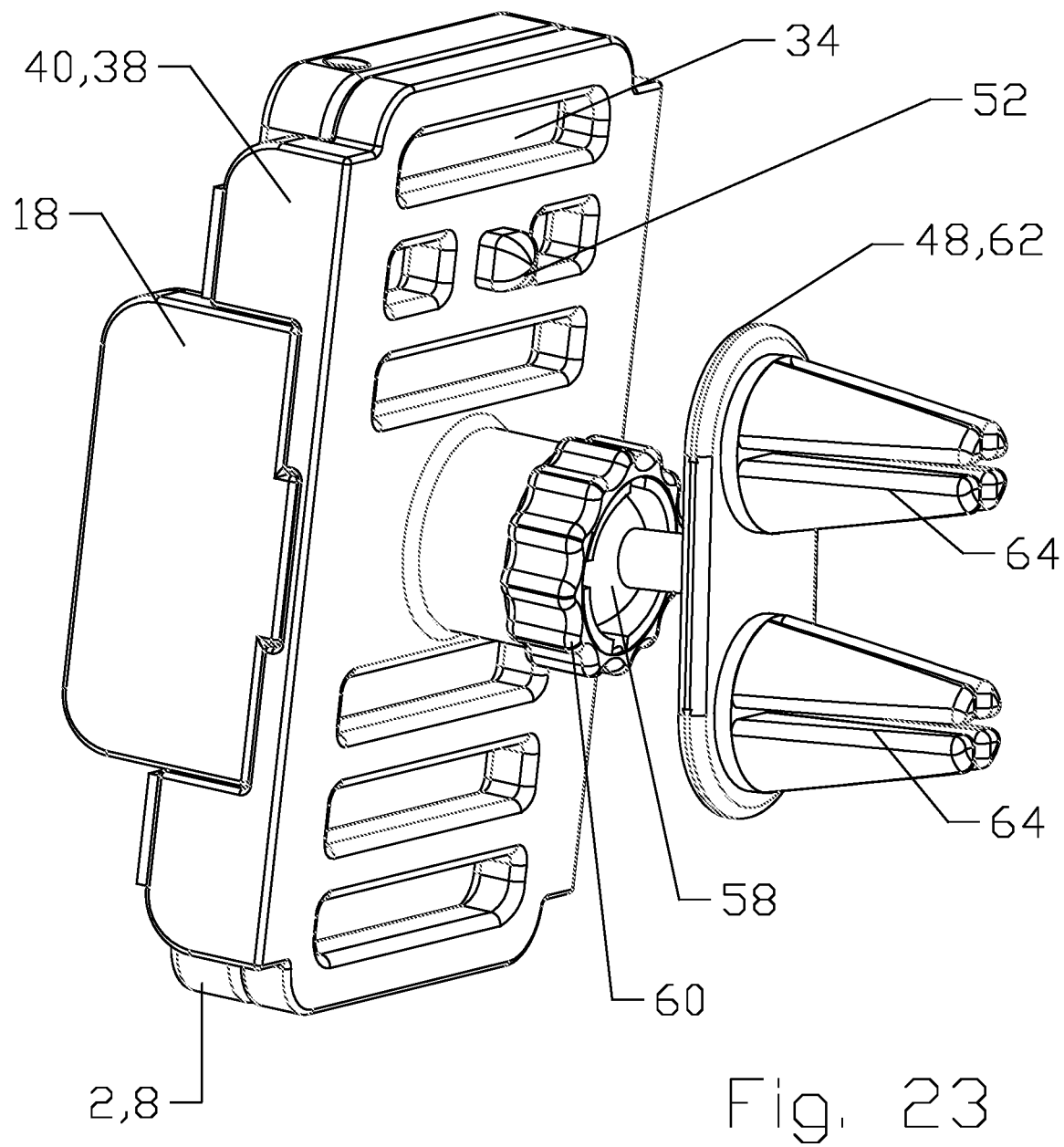
FIG. 23 is a back isometric view of the vehicle mount of FIG. 22.

As shown in FIGS. 22 and 23, the mount portion 48 of the vehicle mount 40 may alternatively utilize a vent grip 62 attached to the vehicle cradle 42 at the ball joint 58. The vent grip 64 includes a pair of polymer or polymer coated vent clips 64 that are slotted both vertically and horizontally, enabling the vent grips 62 to be fitted over and retained upon thin planar surfaces such as vehicle heater/air conditioner vent fins that are either vertical or horizontal.

While mounted, the power bank 2 may be simultaneously charged via direct power connection 66 to a vehicle power supply (such as a CLA or USB port) while the power bank 2 itself charges a battery of the attached electronic device 10, enabling continuous use of electronic device 10 without requiring an electromechanical interconnection with the electronic device 10 (FIG. 16).

Figure 24:
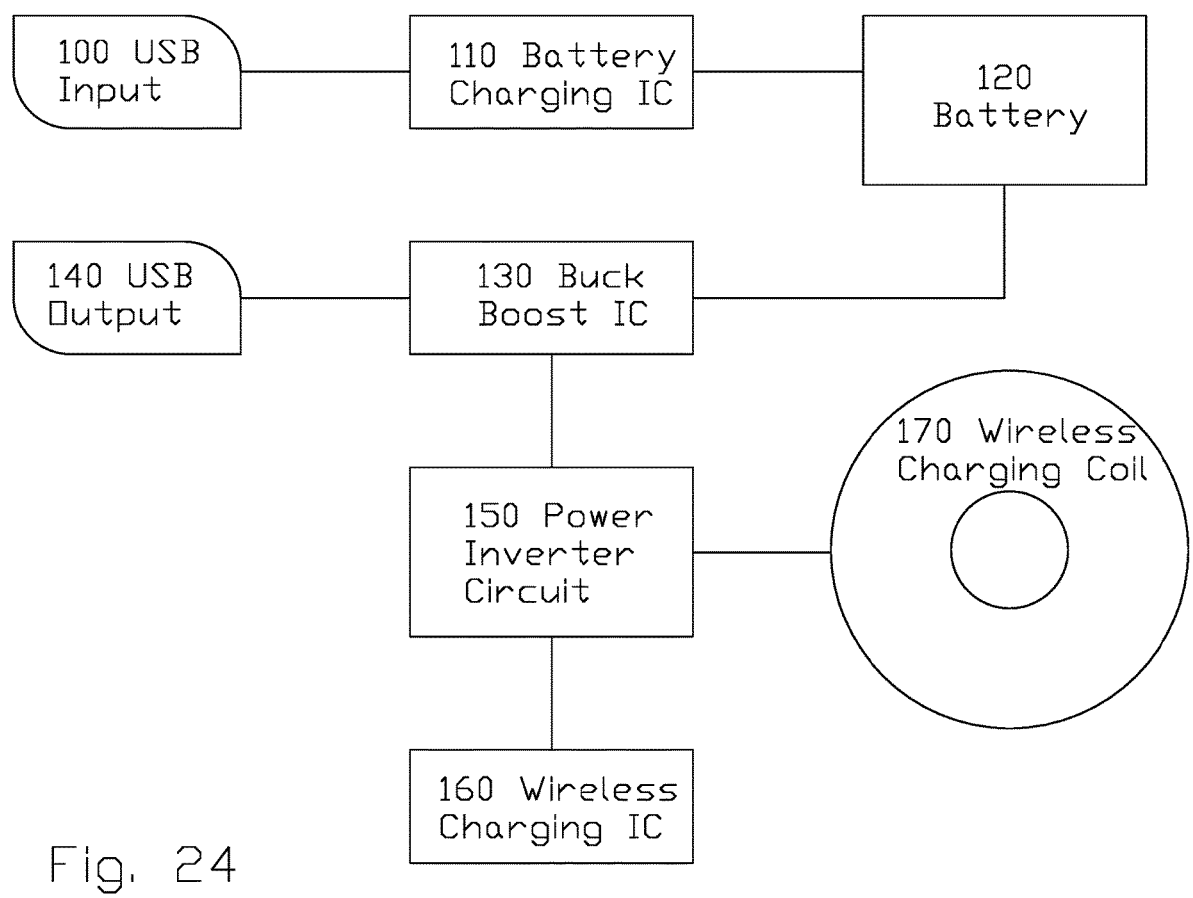
FIG. 24 is a block diagram of electrical circuits of an exemplary power bank.

FIG. 24 demonstrates internal elements and connections of the power bank 2. The power bank 2 may be directly charged via power supplied to, for example, a USB input 100 coupled to a battery charging integrated circuit 110 that is further coupled to a battery cell 120 or battery cell matrix of the power bank 2. Power from the battery cell 120, normalized to a desired voltage, for example by a buck boost type integrated circuit 130 is delivered to one or both of a, for example, USB output 140 or a further power inverter integrated circuit 150 under the control of the wireless charging integrated circuit 160 that drives a wireless charging coil 170 to transmit power via inductive coupling, for example via the QI wireless magnetic induction charging standard.

Figure 25:
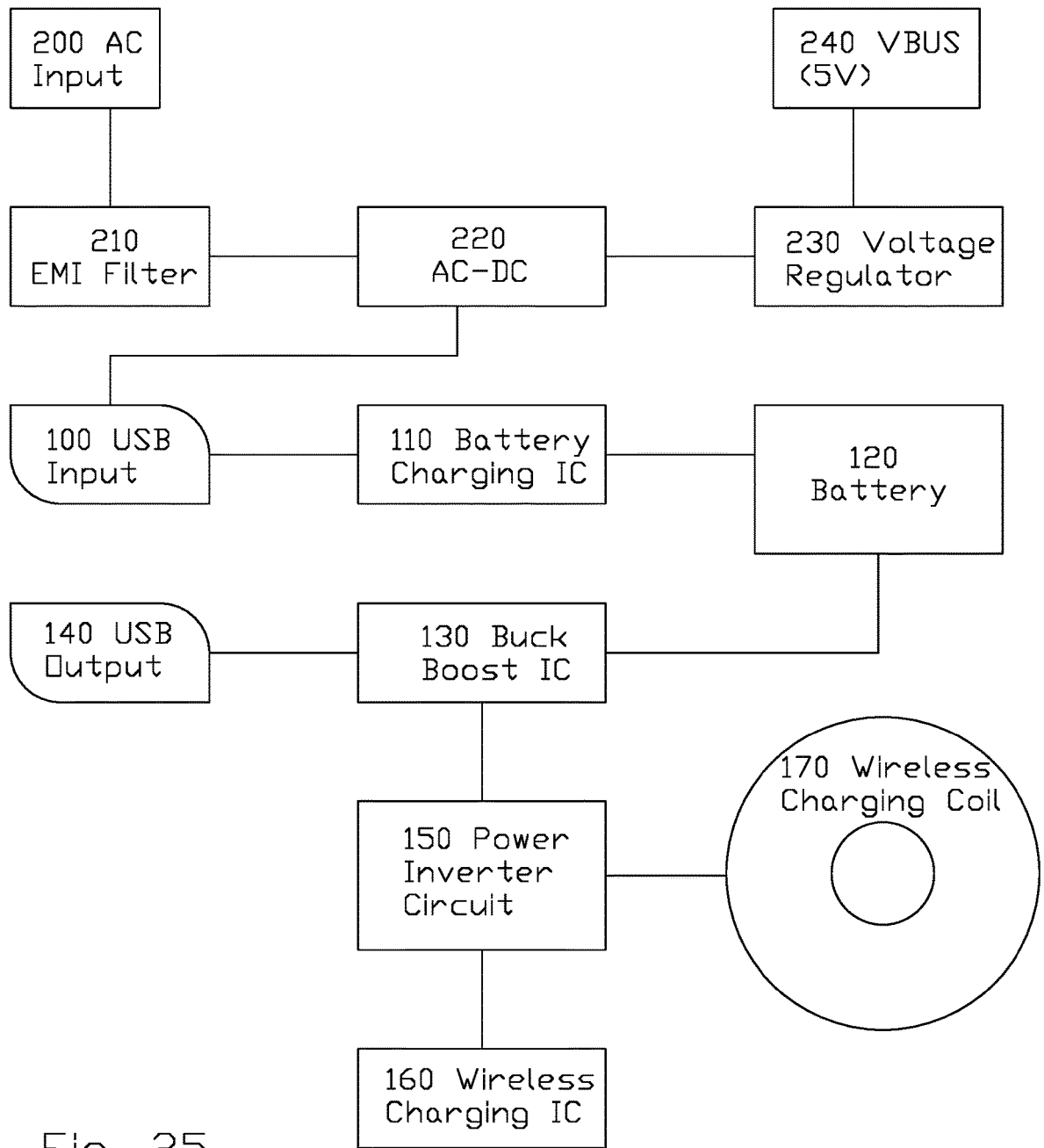
FIG. 25 is a block diagram of electrical circuits of an exemplary power bank coupled to a desk stand.

FIG. 25 similarly demonstrates internal elements of connections of the desk stand when coupled to a mated powerpack (as described above with respect to FIG. 24), further including conversion of input alternating current power 200 through an electromagnetic interference filter 210, AC-DC 220 rectification that is provided to the USB input 100 of the power bank electromechanical interconnection and further through a voltage regulator 230 to a Vbus 240 of the desk stand 24 for powering additional direct connections to the desk stand 24.

One skilled in the art will appreciate that the wireless charging of the electronic device (a wide range of different electronic devices, rather than a specific model) by the power bank 2 eliminates the need for electromechanical attachment via additional cables and/or connectors to the electronic device 10 which both simplifies interconnection requirements and extends the operating life of electronic device 10 as the most frequent wear/eventual interconnection failure point with respect to the electronic device has been eliminated. Similarly, the power bank enables continued use of an electronic device 10 that has already had its electromechanical connection interfaces worn/damaged and/or onboard battery charge capacity degraded. Further, the desk stand 24 and vehicle mount 40 allow quick adaptation of the electronic device 10 to office or home environments where the electronic device 10 may be used for extended periods again without requiring a troublesome conventional electromechanical attachment to the electronic device 10 itself.

| Table of Parts | |
|---|---|
| 2 | Power bank |
| 4 | Charge surface |
| 6 | Battery |
| 8 | Enclosure |
| 10 | Electronic device |
| 12 | Power bank electromechanical connector |
| 14 | Power switch |
| 16 | Depression |
| 18 | Clamp arm |
| 20 | Clamp release button |
| 22 | Nano-suction material surface |
| 24 | Desk stand |
| 26 | Screen |
| 28 | Power bank socket |
| 30 | Stand electromechanical connector |
| 32 | Guide slot |
| 34 | Vent |
| 36 | Backstop surface |
| 38 | Electronic device cradle |
| 39 | Auxiliary output port |
| 40 | Vehicle mount |
| 42 | Vehicle cradle |
| 44 | Power bank retention portion |
| 46 | Electronic device retention portion |
| 48 | Mount portion |
| 50 | Protrusions |
| 52 | Power bank ejection button |
| 54 | Suction cup |
| 56 | Suction cup lever |
| 58 | Ball joint |
| 60 | Tightening ring |
| 62 | Vent grip |
| 64 | Vent clip |
| 66 | Power connection |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

The invention claimed is:

1. A modular wireless power bank system providing supplemental power for an electronic device, the system comprising:
    a power bank comprising: a battery contained within an enclosure, a charge surface for wireless magnetic induction coupling, a power bank electromechanical connector and a means for coupling the enclosure with the electronic device, aligned for power transfer via wireless magnetic induction coupling; and
    a desk stand comprising: a power bank socket configured to receive the enclosure, the power bank socket including a stand electromechanical connector aligned to mate with the power bank electromechanical connector upon insertion of the enclosure into the power bank socket; and an electronic device cradle configured to receive the electronic device; the power bank socket and the electronic device cradle aligned to receive the enclosure and the electronic device either separately or while the enclosure is coupled to the electronic device via the means for coupling.

2. The system of claim 1, wherein the means for coupling is clamp arms spring biased toward a closed position, extendable against the spring bias to grip sides of the electronic device.

3. The system of claim 1, wherein the means for coupling is a nano-suction material surface comprising a plurality of nano-sized suction cups.

4. The system of claim 1, wherein the electronic device cradle aligns the electronic device in an upright position with a screen of the electronic device visible from a forward position.

5. The system of claim 1, wherein the power bank socket includes guide slots which align the enclosure during insertion for coupling between the power bank electromechanical connector and the stand electromechanical connector.

6. The system of claim 1, further including vent slots provided in a backplane in of the power bank socket.

7. The system of claim 1, further including an electromechanical connector in a base of the desk stand.

8. The system of claim 1, further comprising: a vehicle mount; the vehicle mount provided with a vehicle cradle with a power bank retention portion and an electronic device retention portion, the power bank retention portion and the electronic device retention portion aligned to receive the enclosure-and the electronic device either separately or while the power bank is coupled to the electronic device via the means for coupling; and the vehicle mount provided with a mount portion coupled to the vehicle cradle, the mount portion configured to retain the vehicle mount upon a mounting surface of a vehicle.

9. The system of claim 8, wherein the power bank retention portion has protrusions which key with depressions provided in side edges of the power bank, to retain the enclosure within the power bank retention portion.

10. The system of claim 8, wherein the power bank retention portion has a power bank ejection button which pushes the enclosure out of the power bank retention portion when pressed.

11. The system of claim 8, wherein the electronic device retention portion includes spring-loaded clamp arms for gripping a periphery of the electronic device.

12. The system of claim 8, wherein the vehicle cradle is rotatable with respect to the mount portion; whereby the electronic device is orientable in either a landscape or portrait orientation with respect to the mounting surface.

13. The system of claim 8, wherein the vehicle cradle is coupled to the mount portion by a ball joint, the ball joint securable in a desired orientation by a threaded tightening ring.

14. The system of claim 8, wherein the mounting portion includes a suction cup.

15. The system of claim 8, wherein the mounting portion includes a pair of polymer or polymer coated vent grips, the vent grips slotted vertically and horizontally.

16. A method for powering an electronic device, comprising the steps of:
    providing a power bank comprising: a battery contained within an enclosure, a charge surface for wireless magnetic induction coupling, a power bank electromechanical connector and a means for coupling with the electronic device, aligned for power transfer via wireless magnetic induction coupling;
    providing a desk stand comprising: a power bank socket configured to receive the enclosure, the power bank socket including a stand electromechanical connector aligned to mate with the power bank electromechanical connector upon insertion of the enclosure into the power bank socket; and an electronic device cradle configured to receive the electronic device; the power bank socket and the electronic device cradle aligned to receive the power bank and the electronic device either separately or while the power bank is coupled to the electronic device via the means for coupling;
    coupling the power bank to the electronic device;
    inserting the electronic device and power bank into the electronic device cradle and the power bank socket, respectively; and
    transferring power from the power bank to the electronic device via wireless magnetic induction coupling.

17. The method of claim 16, wherein the electronic device is fully charged before the battery of the power bank is charged.

* * * * *